(12) United States Patent
Wang et al.

(10) Patent No.: US 8,553,794 B2
(45) Date of Patent: Oct. 8, 2013

(54) FULL-RATE, FULL-DIVERSITY SPACE-TIME BLOCK CODE TECHNIQUE FOR MULTIPLE TRANSMISSIONS USING SIMPLE LINEAR DECODING COMPLEXITY

(75) Inventors: Jiacheng Wang, Beijing (CN); Hujun Yin, San Jose, CA (US); Yang-seok Choi, Portland, OR (US); Liang Jiang, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 422 days.

(21) Appl. No.: 12/384,628

(22) Filed: Apr. 6, 2009

(65) Prior Publication Data

US 2010/0254472 A1 Oct. 7, 2010

(51) Int. Cl.
*H04B 7/02* (2006.01)
(52) U.S. Cl.
USPC .......................... 375/267; 375/260; 375/295
(58) Field of Classification Search
USPC .......... 375/267, 295, 260; 455/13.3; 370/339
See application file for complete search history.

(56) References Cited

U.S. PATENT DOCUMENTS

| 7,251,768 | B2* | 7/2007 | Giannakis et al. | 714/755 |
|---|---|---|---|---|
| 7,801,237 | B2* | 9/2010 | Chae et al. | 375/267 |
| 7,894,544 | B2* | 2/2011 | Bang et al. | 375/295 |
| 2005/0281351 | A1* | 12/2005 | Jeong et al. | 375/267 |
| 2006/0039495 | A1 | 2/2006 | Chae et al. | |
| 2006/0039496 | A1* | 2/2006 | Chae et al. | 375/267 |
| 2008/0113632 | A1 | 5/2008 | Chae et al. | |
| 2009/0003466 | A1* | 1/2009 | Taherzadehboroujeni et al. | 375/260 |
| 2010/0008447 | A1* | 1/2010 | Mueck et al. | 375/299 |
| 2010/0034310 | A1* | 2/2010 | Nam et al. | 375/267 |
| 2010/0041350 | A1* | 2/2010 | Zhang et al. | 455/101 |
| 2010/0208833 | A1* | 8/2010 | Lee | 375/267 |
| 2011/0191411 | A1* | 8/2011 | Venkatachalam et al. | 709/203 |

FOREIGN PATENT DOCUMENTS

| KR | 10-2008-0094056 A | 10/2008 |
|---|---|---|
| KR | 10-2008-0094935 A | 10/2008 |
| WO | 2010/117775 A2 | 10/2010 |
| WO | 2010/117775 A3 | 1/2011 |

OTHER PUBLICATIONS

International Search Report and Written Opinion received for PCT Patent Application No. PCT/US2010/029184, mailed on Nov. 15, 2010, 9 pages.
Preliminary Report on Patentability received for PCT application No. PCT/US2010/029184, mailed on Oct. 20, 2011, 8 pages.
Office Action received for Korean Patent Application No. 10-2011-7026017, mailed on Apr. 26, 2013, 7 pages of Office Action including 3 pages of English Translation.

\* cited by examiner

*Primary Examiner* — Shuwang Liu
*Assistant Examiner* — Helene Tayong
(74) *Attorney, Agent, or Firm* — Thorpe North & Western, LLP

(57) ABSTRACT

An embodiment of the present invention provides a space-time block code (STBC) transmission method for 4 transmit antennas, comprising adding two 2×2 orthogonal pre-coding before a two Alamouti transmission for a 4 transmit antennas scheme.

12 Claims, 2 Drawing Sheets

FULL-RATE, FULL-DIVERSITY SPACE-TIME BLOCK CODE TECHNIQUE FOR MULTIPLE TRANSMISSIONS USING SIMPLE LINEAR DECODING COMPLEXITY

BACKGROUND

Multiple antennas technology (MIMO, Multiple Input Multiple Output) is one of the most important technologies of modern communication systems. Among the multiple antennas technologies, spatial diversity attracts more attention, since it exploits the independent fading between the antennas to overcome the severe attenuation of signal between a transmit end and a receiving end, and provides a more reliable signal, especially for control signaling; which requires more reliability than usual data signals. This spatial diversity gain is obtained via a space-time block codes (STBC) scheme.

The first STBC is an Alamouti scheme, which is a full-diversity (achieves the maximum diversity order, i.e., diversity order 2 with 2 transmit antennas) and full-rate (normalized rate of 1 symbol/s/Hz) over 2 transmit antennas and 2 symbols time slot. An Alamouti STBC scheme is generalized by using orthogonal design theory for more than 2 transmit antennas. These STBC schemes have full-diversity gain and a simple linear decoding algorithm. However, for complex modulation constellations, such as QAM and PSK, the orthogonal design theory based STBC have the maximum rate 0.75 (¾), thus the transmission rate is less. Moreover, it has been proven theoretically that for complex constellations, an Almouti scheme is the unique scheme with full-rate, full-diversity and a simple linear decoding algorithm at the same time.

Another approach of STBC is pre-coded STBC. These schemes try to achieve full-rate and full-diversity gain for more than 2 transmit antennas, but at the cost of simple linear decoding complexity being lost. To achieve full-diversity, a full maximum likelihood (ML) decoding algorithm should be used. The complexity of an ML algorithm is exponential with the number of transmit antennas and constellation size. This high complexity makes it is impractical to use this STBC scheme, especially for high modulation types and more than 2 transmit antennas.

Thus, a strong need exists for a full-rate, full-diversity space-time block code technique for multiple transmissions using simple linear decoding complexity.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
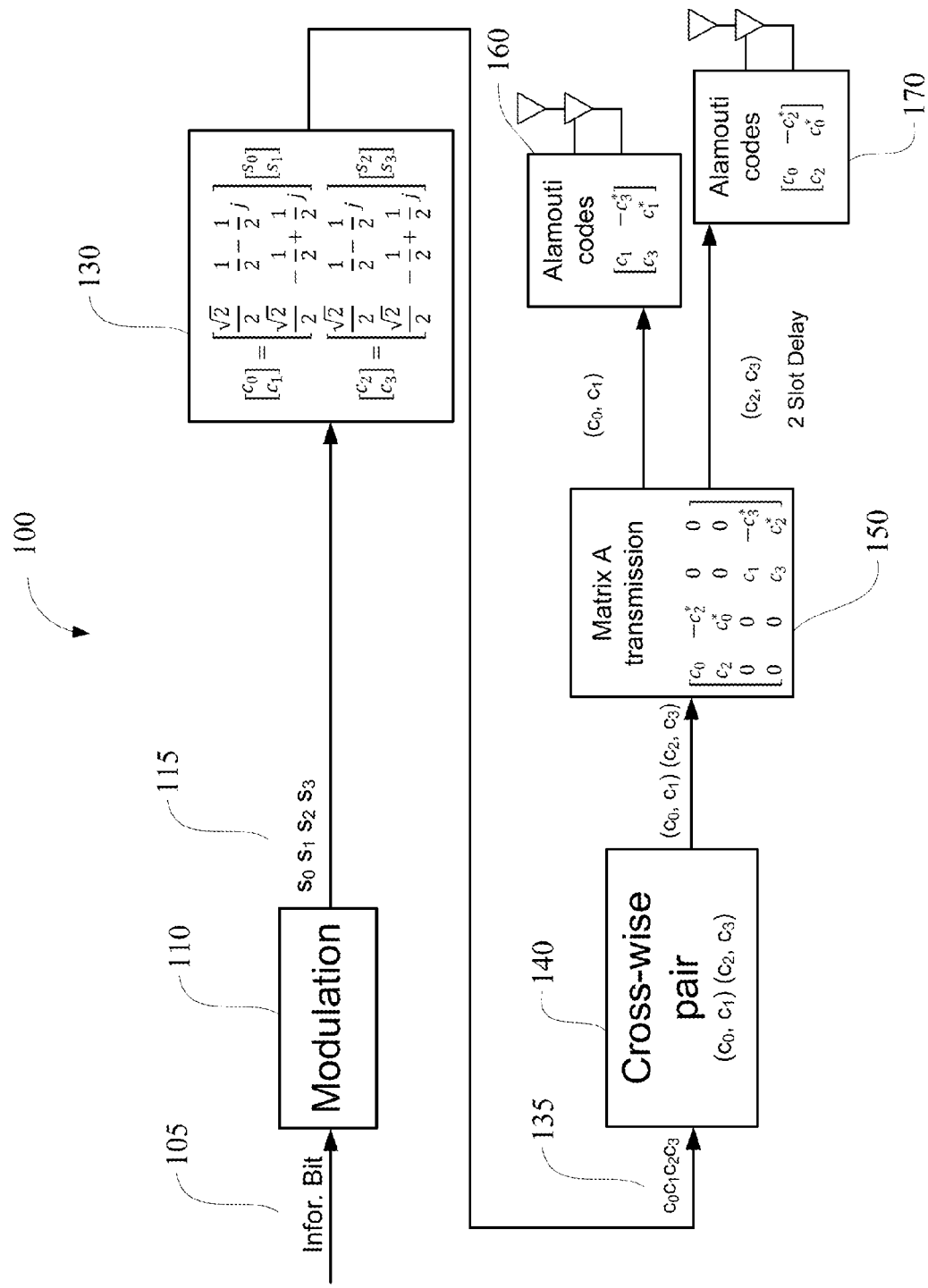
FIG. 1 depicts a block diagram for a STBC scheme of 4 transmit antennas of an embodiment of the present invention.

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the preset invention may be practiced without these specific details. In other instances, well-known methods, procedures, components and circuits have not been described in detail so as not to obscure the present invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. For example, "a plurality of stations" may include two or more stations.

Embodiments of the present invention provide a STBC for 4 transmit antennas which achieves full-rate, full-diversity and uses a simple linear decoding algorithm at the same time. STBC is widely used in current wireless communication systems, such as 3G, WiMAX, WiFi, to improve the signal reliability—although the present invention is not limited in this respect. With the proposed STBC scheme of embodiments of the present invention, the transmit rate, diversity gain and simple decoding algorithm are improved at the same time; which much improves the performance of the communication systems, especially for the control signaling which require highly reliable transmissions. Usually, for 4 transmit antennas, a 4×4 pre-coding matrix is used for STBC, and full ML decoding algorithm is used to obtain order 4 diversity gain. However, embodiments of the present invention are based on a two concatenated Alamouti scheme for 4 transmit antennas and two 2×2 pre-coding matrices are used to construct the transmit scheme, and the order 4 diversity gain is obtained by a simple linear decoding algorithm.

Embodiments of the present invention provide adding two orthogonal pre-coding before a two Alamouti transmission for 4 transmit antennas scheme in a current mobile WiMAX standard—although the present invention is not limited to the WiMAX standard. Also, embodiments of the present invention provide transmitting an Alamouti STBC symbols pair for improved performance and reduction of decoding complexity.

In the current mobile WiMAX standard, the Matrix A STBC scheme for 4 transmit antennas is $$A = \begin{bmatrix} s_0 & -s_1^* & 0 & 0 \\ s_1 & s_0^* & 0 & 0 \\ 0 & 0 & s_2 & -s_3^* \\ 0 & 0 & s_3 & s_2^* \end{bmatrix}. \quad (1)$$

Actually, this is a concatenated 2 Alamouti scheme for 4 transmit antennas case, at the first two symbols time slot, Antenna 0 and Antenna 1 transmit symbols $s_0$ and $s_1$ with Alamouti STBC scheme, Antenna 2 and Antenna 3 are idle; for the second two symbols time slot, Antenna 2 and Antenna 3 transmit symbols $s_2$ and $s_3$ with Alamouti STBC scheme, Antenna 0 and Antenna 1 are idle. It is easily seen that the performance of Matrix A is identical with the Alamouti scheme: full-rate: 4 symbols are transmitted during 4 symbols time slot, simple linear decoding algorithm, but the diversity gain order is 2 with 4 transmit antennas.

From the above description, since a symbol only transmitted by two independent antennas, for example, symbol $s_0$ or $s_1$ is transmitted by Antenna 0 and Antenna 1, $s_2$ or $s_3$ is transmitted by Antenna 2 and Antenna 3. To a achieve full-diversity order 4, a symbol should be transmitted by four independent fading channels, i.e., symbol $s_0$ should be transmitted by Antenna 0, 1, 2 and 3 within 4 symbols time slot.

For simplicity, in the following, it is assumed there is only 1 receive antenna, but for more than 1 receive antenna, the transmit STBC scheme is the same, with just the need to use a different receiver side process technique, such as maximum receive combination (MRC).

Assume the 4 channel gain from the 4 transmit antennas to the receive antenna are $h_0$, $h_1$, h2 and h3, respectively. As shown in FIG. 1 at 100, after the source information bit 105 is fed into the modulator 110, we get the 4 modulated symbols as a STBC transmission block: $s_0$, $s_1$, $s_2$ and $s_3$ 115. Then two 2×2 orthogonal pre-coding matrices are used to perform pre-coding two times, for example, the following orthogonal pre-coding is performed, as illustrated with the precoding matrices 130 that are listed below as matrices (2) and (3):

$$\begin{bmatrix} c_0 \\ c_1 \end{bmatrix} = \begin{bmatrix} \frac{\sqrt{2}}{2} & \frac{1}{2} - \frac{1}{2}j \\ \frac{\sqrt{2}}{2} & -\frac{1}{2} + \frac{1}{2}j \end{bmatrix} \begin{bmatrix} s_0 \\ s_1 \end{bmatrix} \quad (2)$$

$$\begin{bmatrix} c_2 \\ c_3 \end{bmatrix} = \begin{bmatrix} \frac{\sqrt{2}}{2} & \frac{1}{2} - \frac{1}{2}j \\ \frac{\sqrt{2}}{2} & -\frac{1}{2} + \frac{1}{2}j \end{bmatrix} \begin{bmatrix} s_2 \\ s_3 \end{bmatrix} \quad (3)$$

It is noted that the two 2×2 pre-coding matrices in (2) and (3) can be another different matrix, moreover, they can be the same or total different pre-coding matrix for the two pre-codes for $s_0$, $s_1$ and $s_2$, $s_3$.

The 4 output symbols of the two pre-coding: $c_0$, $c_1$, $c_2$ and $c_3$ are then interleaved 140 with ordering $c_0 c_2 c_1 c_3$ 135, and then the matrix A STBC transmission 150 scheme for 4 transmit antennas are used to transmit symbols $c_0$, $c_2$, $c_1$, and $c_3$ $$\begin{bmatrix} c_0 & -c_2^* & 0 & 0 \\ c_2 & c_0^* & 0 & 0 \\ 0 & 0 & c_1 & -c_3^* \\ 0 & 0 & c_3 & c_1^* \end{bmatrix}. \quad (4)$$

i.e., for the first 2 transmit time slot, $c_0$ and $c_2$ are transmitted 160 with an Alamouti scheme by Antenna 0 and Antenna 1, for the second 2 transmit time slot, $c_1$ and $c_3$ are transmitted 170 with the Alamouti scheme by Antenna 2 and Antenna 3.

By the pre-coding, symbols $s_0$ and $s_1$ are in symbol $c_0$, symbols $s_2$ and $s_3$ are in symbol $c_2$, and moreover, by an Alamouti scheme, all the 4 original symbols $s_0$, $s_1$, $s_2$ and $s_3$ 115 are spread to the 4 transmit antennas, so full-diversity, order 4 diversity gain can be obtained.

With the assumption of 4 channel gain between 4 transmit antennas and the receive antenna: $h_0$, $h_1$, $h_2$ and $h_3$, the 4 received symbols $r_0$, $r_1$, $r_2$ and $r_3$ are $$\begin{bmatrix} r_0 \\ r_1 \\ r_2 \\ r_3 \end{bmatrix} = \begin{bmatrix} h_0 c_0 + h_1 c_2 \\ -h_0 c_2^* + h_1 c_0^* \\ h_2 c_1 + h_3 c_3 \\ -h_2 c_3^* + h_3 c_1^* \end{bmatrix} + \begin{bmatrix} n_0 \\ n_1 \\ n_2 \\ n_3 \end{bmatrix}, \quad (5)$$

where $n_0$, $n_1$, $n_2$ and $n_3$ are AWGN noise.

Then $r_0$ and $r_1$ are combined with the Alamouti receive combination, $r_2$ and $r_3$ are also combined with the Alamouti receive combination, the received symbols are $$\begin{bmatrix} y_0 \\ y_1 \\ y_2 \\ y_3 \end{bmatrix} = \begin{bmatrix} h_0^* r_0 + h_1 r_1^* \\ h_1^* r_0 - h_0 r_1^* \\ h_2^* r_2 + h_3 r_3^* \\ h_3^* r_2 - h_2 r_3^* \end{bmatrix}. \quad (6)$$

For simplicity, the noise term is dropped.

Finally, for detecting the 4 transmitted symbols, the following 2 equations are constructed according the pre-coding and Alamouti decoding algorithm:

$$\begin{bmatrix} \frac{\sqrt{2}}{2}(|h_0|^2 + |h_1|^2) & \left(\frac{1}{2} - \frac{1}{2}j\right)(|h_0|^2 + |h_1|^2) \\ \frac{\sqrt{2}}{2}(|h_2|^2 + |h_3|^2) & \left(-\frac{1}{2} + \frac{1}{2}j\right)(|h_2|^2 + |h_3|^2) \end{bmatrix} \begin{bmatrix} x_0 \\ x_1 \end{bmatrix} = \begin{bmatrix} y_0 \\ y_2 \end{bmatrix} \quad (7)$$

$$\begin{bmatrix} \frac{\sqrt{2}}{2}(|h_0|^2 + |h_1|^2) & \left(\frac{1}{2} - \frac{1}{2}j\right)(|h_0|^2 + |h_1|^2) \\ \frac{\sqrt{2}}{2}(|h_2|^2 + |h_3|^2) & \left(-\frac{1}{2} + \frac{1}{2}j\right)(|h_2|^2 + |h_3|^2) \end{bmatrix} \begin{bmatrix} x_2 \\ x_3 \end{bmatrix} = \begin{bmatrix} y_1 \\ y_3 \end{bmatrix} \quad (8)$$

These two 2×2 equations are solved by fast-MLD decoding algorithm and the solutions are the detected symbols of the 4 transmitted symbols by the transmitter.

In the following, fast-MLD decoding algorithm is described to solve (7) and (8) with linear decoding complexity (linear with the modulation constellation size). For simplicity, assume a simple BPSK modulation is used. The detection algorithm for higher modulation is similar. And the detection algorithm of (7) is described, and (8) is similar.

For BPSK, $x_0$ have two possible values: $x_0 = -1$ or $x_0 = 1$. For the assumption of $x_0 = 1$, cancel its contributions to right side of the equation (7), then get the equation with only one unknown symbol $x_1$ as $$\begin{bmatrix} \left(\frac{1}{2} - \frac{1}{2}j\right)(|h_0|^2 + |h_1|^2) \\ \left(-\frac{1}{2} + \frac{1}{2}j\right)(|h_0|^2 + |h_1|^2) \end{bmatrix}[x_1] = \begin{bmatrix} y_0 - \frac{\sqrt{2}}{2}(|h_0|^2 + |h_1|^2) \\ y_2 - \frac{\sqrt{2}}{2}(|h_0|^2 + |h_1|^2) \end{bmatrix} \quad (9)$$

Then (9) can be solved by a simple linear MRC method to obtain solution $x_1$. For this assumption detected symbols pair of $(x_0, x_1)$, calculate the distance between the right-hand side signal of (7) and this assumption. With the same procedure, for another assumption $x_0=-1$, another detected symbols pair $(x_0, x_1)$ and its corresponding distance to the right-hand side signal of (7) is obtained. From these two assumption symbols pair, the shortest distance to the right-hand side signal of (7) is selected as the final detected symbols.

It is easily seen that for BPSK, the total candidate symbols pair number is 2, i.e., the constellation size of BPSK. For QPSK, the total candidate symbols pair number is 4, and for 16QAM, it is 16. The final decoding complexity is linear with the constellation size.

With simple pre-coding and transmit order changing, the full-rate, full-diversity, and linear decoding algorithm for 4 transmit antennas STBC scheme is disclosed herein.

Figure 2:
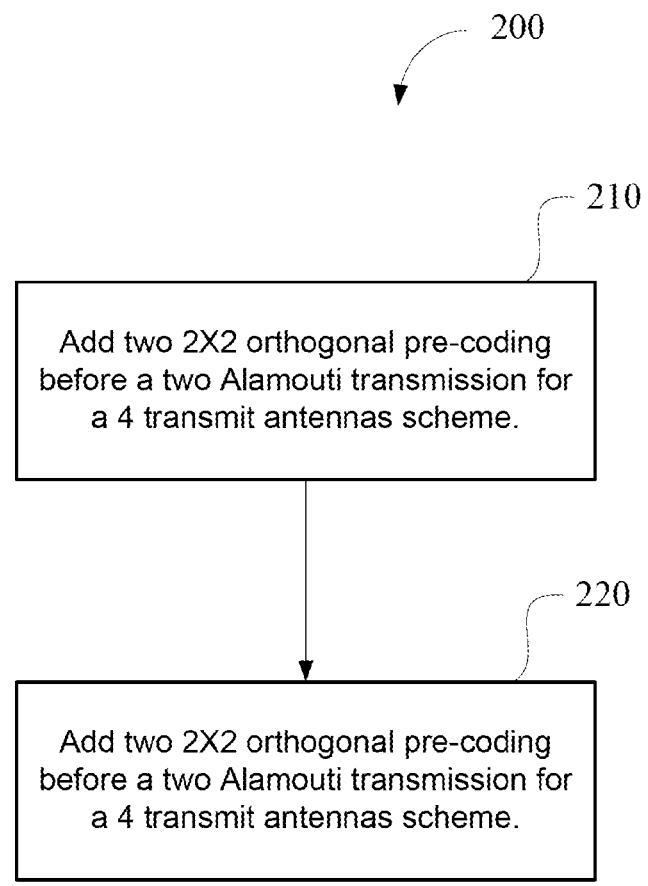
FIG. 2. illustrates a method according to embodiments of the present invention.

Turning now to FIG. 2 is a space-time block code (STBC) transmission method for 4 transmit antennas, comprising adding two 2×2 orthogonal pre-coding before a two Alamouti transmission for a 4 transmit antennas scheme 210. This method may further comprise at 220 transmitting Alamouti space-time block code symbol pairs. As set forth above the two Alamouti transmission for a 4 transmit antennas scheme may be based on a two concatenated Alamouti scheme for 4 transmit antennas, and the two 2×2 pre-coding matrices may be used to construct the transmit scheme, and the order 4 diversity gain may be obtained by a simple linear decoding algorithm.

Further, the two 2×2 pre-coding matrices may be orthogonal pre-coding matrices and may be used to perform pre-coding two times and in an embodiment of the present invention, the following orthogonal pre-coding may be performed $$\begin{bmatrix} c_0 \\ c_1 \end{bmatrix} = \begin{bmatrix} \frac{\sqrt{2}}{2} & \frac{1}{2} - \frac{1}{2}j \\ \frac{\sqrt{2}}{2} & -\frac{1}{2} + \frac{1}{2}j \end{bmatrix} \begin{bmatrix} s_0 \\ s_1 \end{bmatrix} \quad (2)$$

$$\begin{bmatrix} c_2 \\ c_3 \end{bmatrix} = \begin{bmatrix} \frac{\sqrt{2}}{2} & \frac{1}{2} - \frac{1}{2}j \\ \frac{\sqrt{2}}{2} & -\frac{1}{2} + \frac{1}{2}j \end{bmatrix} \begin{bmatrix} s_2 \\ s_3 \end{bmatrix}. \quad (3)$$

Also, as mentioned above, the two pre-coding matrices in (2) and (3) may be another different matrix and may be the same or total different pre-coding matrix for the two pre-codes for $s_0$, $s_1$ and $s_2$, $s_3$.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

We claim:

1. A space-time block code (STBC) transmission method for 4 transmit antennas, comprising:
    performing a first precoding by applying a first 2×2 orthogonal pre-coding matrix to a first pair of transmit symbols, $S_0$ and $S_1$;
    performing a second precoding by applying a second 2×2 orthogonal pre-coding matrix to a second pair of transmit symbols $S_2$ and $S_3$, wherein said first and second precoding generates two pairs of precoded output symbols, (C0, C1) and (C2, C3); and
    interleaving said two pairs of precoded output symbols to form cross-wise pairs of said precoded output symbols ($C_0$, $C_2$) and ($C_1$, $C_3$), wherein the interleaving generates a STBC transmission matrix for a two Alamouti transmission for a 4 transmit antennas scheme that enables simple, linear decoding.

2. The method of claim 1, further comprising transmitting Alamouti space-time block code symbol pairs.

3. The method of claim 2, wherein said two Alamouti transmission for the 4 transmit antennas scheme is based on a two concatenated Alamouti scheme for 4 transmit antennas, and wherein said first and second 2×2 pre-coding matrices are used to construct said transmit scheme, and an order 4 diversity gain is obtained by a simple linear decoding algorithm.

4. The method of claim 3, wherein said first and second 2×2 pre-coding matrices are orthogonal pre-coding matrices and are used to perform said first and second pre-coding and wherein orthogonal pre-coding is performed using the first and second 2×2 orthogonal pre-coding matrices, where:

$$\begin{bmatrix} c_0 \\ c_1 \end{bmatrix} = \begin{bmatrix} \frac{\sqrt{2}}{2} & \frac{1}{2} - \frac{1}{2}j \\ \frac{\sqrt{2}}{2} & -\frac{1}{2} + \frac{1}{2}j \end{bmatrix} \begin{bmatrix} s_0 \\ s_1 \end{bmatrix} \quad (2)$$

$$\begin{bmatrix} c_2 \\ c_3 \end{bmatrix} = \begin{bmatrix} \frac{\sqrt{2}}{2} & \frac{1}{2} - \frac{1}{2}j \\ \frac{\sqrt{2}}{2} & -\frac{1}{2} + \frac{1}{2}j \end{bmatrix} \begin{bmatrix} s_2 \\ s_3 \end{bmatrix}. \quad (3)$$

5. An apparatus, comprising:
    a transceiver using a space-time block code (STBC) transmission method for 4 transmit antennas that includes:
    performing a first precoding by applying a first 2×2 orthogonal pre-coding matrix to a first pair of transmit symbols $S_0$ and $S_1$;
    performing a second precoding by applying a second 2×2 orthogonal pre-coding matrix to a second pair of transmit symbols $S_2$ and $S_2$, wherein said first and second precoding generates two pairs of precoded output symbols, (C0, C1) and (C2, C3); and
    interleaving said two pairs of precoded output symbols to form cross-wise pairs of said precoded output symbols ($C_0$, $C_2$) and ($C_1$, $C_3$), wherein the interleaving generates a STBC transmission matrix for a two Alamouti transmission for a 4 transmit antennas scheme that enables simple, linear decoding.

6. The apparatus of claim 5, further comprising said transceiver adapted to transmit Alamouti space-time block code symbol pairs.

7. The apparatus of claim 6, wherein said two Alamouti transmission for the 4 transmit antennas scheme is based on a two concatenated Alamouti scheme for 4 transmit antennas, and wherein said first and second 2×2 pre-coding matrices are used to construct said transmit scheme, and an order 4 diversity gain is obtained by a simple linear decoding algorithm.

8. The apparatus of claim 7, wherein said first and second 2×2 pre-coding matrices are orthogonal pre-coding matrices and are used to perform said first and second pre-coding and wherein the following orthogonal pre-coding is performed using the first and second 2×2 orthogonal pre-coding matrices, where $$\begin{bmatrix} c_0 \\ c_1 \end{bmatrix} = \begin{bmatrix} \frac{\sqrt{2}}{2} & \frac{1}{2} - \frac{1}{2}j \\ \frac{\sqrt{2}}{2} & -\frac{1}{2} + \frac{1}{2}j \end{bmatrix} \begin{bmatrix} s_0 \\ s_1 \end{bmatrix} \quad (2)$$

$$\begin{bmatrix} c_2 \\ c_3 \end{bmatrix} = \begin{bmatrix} \frac{\sqrt{2}}{2} & \frac{1}{2} - \frac{1}{2}j \\ \frac{\sqrt{2}}{2} & -\frac{1}{2} + \frac{1}{2}j \end{bmatrix} \begin{bmatrix} s_2 \\ s_3 \end{bmatrix}. \quad (3)$$

9. A non-transitory machine-accessible medium that provides instructions, which when accessed, cause a machine to perform operations comprising:
    using a space-time block code (STBC) transmission method for 4 transmit antennas, including:
    performing a first precoding by applying a first 2×2 orthogonal pre-coding matrix to a first pair of transmit symbols $S_0$ and $S_1$;
    performing a second precoding by applying a second 2×2 orthogonal pre-coding matrix to a second pair of transmit symbols $S_2$ and $S_3$, wherein said first and second precoding generates two pairs of precoded output symbols, (C0, C1) and (C2, C3); and
    interleaving said two pairs of precoded output symbols to form cross-wise pairs of said precoded output symbols ($C_0$, $C_2$) and ($C_1$, $C_3$), wherein the interleaving generates a STBC transmission matrix for a two Alamouti transmission for a 4 transmit antennas scheme that enables simple, linear decoding.

10. The non-transitory machine-accessible medium of claim 9, further comprising further instructions, which when accessed further comprises transmitting Alamouti space-time block code symbol pairs.

11. The non-transitory machine-accessible medium of claim 10, wherein said two Alamouti transmission for the 4 transmit antennas scheme is based on a two concatenated Alamouti scheme for 4 transmit antennas, and wherein said first and second 2×2 pre-coding matrices are used to construct said transmit scheme, and an order 4 diversity gain is obtained by a simple linear decoding algorithm.

12. The non-transitory machine-accessible medium of claim 11, wherein said first and second 2×2 pre-coding matrices are orthogonal pre-coding matrices and are used to perform said first and second pre-coding and wherein the following orthogonal pre-coding is performed using the first and second 2×2 orthogonal pre-coding matrices, where $$\begin{bmatrix} c_0 \\ c_1 \end{bmatrix} = \begin{bmatrix} \frac{\sqrt{2}}{2} & \frac{1}{2} - \frac{1}{2}j \\ \frac{\sqrt{2}}{2} & -\frac{1}{2} + \frac{1}{2}j \end{bmatrix} \begin{bmatrix} s_0 \\ s_1 \end{bmatrix} \quad (2)$$

$$\begin{bmatrix} c_2 \\ c_3 \end{bmatrix} = \begin{bmatrix} \frac{\sqrt{2}}{2} & \frac{1}{2} - \frac{1}{2}j \\ \frac{\sqrt{2}}{2} & -\frac{1}{2} + \frac{1}{2}j \end{bmatrix} \begin{bmatrix} s_2 \\ s_3 \end{bmatrix}. \quad (3)$$

* * * * *